United States Patent Office 3,425,910
Patented Feb. 4, 1969

3,425,910
PRODUCTION OF CYCLODEXTRIN
Frederick C. Armbruster and Earl R. Kooi, La Grange, Ill., assignors to Corn Products Company, New York, N.Y., a corporation of Delaware
No Drawing. Filed Oct. 24, 1966, Ser. No. 588,755
U.S. Cl. 195—31      25 Claims
Int. Cl. C12d 13/02, 13/04

The present invention relates to an improved process for the enzymatic production of cyclodextrins from starch.

Cyclodextrins, also known as Schardinger dextrins, are comprised of six or more anhydro-α-D-glucose residues bonded together with 1,4-linkages to form cyclic compounds. Cyclodextrins may be more specifically classified by the number of glucose units present. The six membered ring is referred to as alpha-cyclodextrin or cyclo-hexaamylose, the seven membered ring as beta-cyclodextrin or cycloheptaamylose, and so forth.

As a result of its unique cyclic structure, cyclodextrins offer considerable potential as complexing agents because they form inclusion compounds with molecules which reside within the cavity of the cyclic molecule. Potential applications in the food, tobacco, and medicinal fields as well as many other fields, are numerous.

Cyclodextrins are produced from starch by the action of an enzyme commonly known as cyclodextrin transglycosylase (B. macerans amylase). The source of the enzyme is usually a culture of Bacillus macerans. The capacity to produce the enzyme which synthesizes the cyclodextrins is frequently a criterion which serves to distinguish strains of Bacillus macerans from other closely related microorganisms. To produce the cyclodextrin synthesizing enzyme Bacillus macerans is grown under suitable conditions on appropriate media containing suitable sources of nitrogen, carbon, growth factors and minerals. Various appropriate means for producing cyclodextrin transglycosylase are described in the literature (D. French in "Methods in Enzymology," S. P. Colowick and N. O. Kaplan, editors, Academic Press, New York, N.Y., vol. V, 1962, pp. 148–155).

The amount of cyclodextrin transglycosylase activity present in Bacillus macerans preparations is conveniently measured by the Tilden-Hudson procedure (E. B. Tilden and C. S. Hudson, J. Bacteriol 43, 527–544, 1942). This assay procedure is applicable to crude culture liquors or to enzyme preparations that have been purified or concentrated by evaporation, adsorption on suitable adsorbents and subsequent elution therefrom, solvent or salt precipitation, or fractionation, or other means known to those skilled in the art. Crude culture liquors are generally found to contain 3–6 Tilden-Hudson units per milliliter.

According to conventional past procedures for producing cyclodextrin, cyclodextrin transglycosylase is added to a dilute solution of an appropriate gelatinized starch and enzymolysis is permitted to proceed under conditions which are conducive to continued enzyme action for sufficient time to permit the conversion of the starch to cyclodextrin.

Heretofore it has been preferred to use potato starch because of its reduced tendency to retrograde at the conversion temperatures employed. Furthermore, it has not been considered feasible to use potato starch at concentrations exceeding 5% solids because of the unmanageability of higher starch concentrations due to high viscosity as well as to starch retrogradation. If the starch retrogrades during enzymolysis, it results in the presence of much unconverted starch in the conversion liquors, which increases the difficulty of recovering the cyclodextrin present. Similarly, modified starches have not generally been used as a substrate because the yield of cyclodextrin obtained therefrom has been substantially lower than those obtained from unmodified starch. For a description of prior art processes, see D. French et al. Die Stärke 15, 280–284 (1963).

In spite of being known heretofore, these cyclic dextrins have not been available in large quantities. Economic means for their production has not previously existed. Many factors contribute to the high cost of producing cyclodextrin by prior art processes.

One major disadvantage of the prior art processes for the production of cyclodextrin is the fact that conversion is feasible only at low dry substance concentration. The cost of handling large volumes of liquid, including heating to very high temperatures and subsequently lowering the temperature, as well as holding during long conversion periods in order to produce cyclodextrin in substantial quantities, made the prior art production processes economically unattractive.

The economic situation is further aggravated by the fact that in order to recover the cyclodextrin from dilute conversion liquors a suitable precipitant, trichloroethylene, for example, is added in order to render the cyclodextrin substantially insoluble. The solubilities of the cyclodextrin complexes in these dilute liquors are such that it is not possible to recover all the cyclodextrin present in the liquors. For example, by this process the solubility of cyclodextrin in the presence of trichloroethylene is such that 20% of the total cyclodextrin present remains in solution, which results in a substantial loss due to failure to recover all the cyclodextrin present.

It is an object of the present invention to provide a process for the conversion of starch to cyclodextrin wherein the starchy substrate is present in solution at a high solids content and cyclodextrin is produced in higher concentrations than heretofore.

It is another object of the present invention to provide a process for producing cyclodextrin from starch wherein the cyclodextrin or complexes thereof are easily crystallizable and may crystallize during conversion.

Another object of the present invention is to permit the economic use of starches for cyclodextrin conversions which would not previously have been suitable because of their inherently poor paste properties or retrogradation tendencies.

A further object of the present invention is to provide a practical process for obtaining high yields of cyclodextrin from starch.

Other objects of the present invention will be apparent hereinafter from the following description and from the recitals of the appended claims.

The present invention provides a process for preparing cyclodextrin from a starch hydrolysate having a DE not exceeding about 20 which comprises subjecting said starch hydrolysate to conversion with cyclodextrin transglycosylase in an aqueous medium to obtain a conversion product containing cyclodextrin.

The present invention also provides a process for preparing cyclodextrin from starch which comprises partially hydrolyzing starch to a DE not exceeding about 20 and subsequently subjecting the partially hydrolyzed starch to conversion with cyclodextrin transglycosylase in an aqueous medium to obtain a conversion product containing cyclodextrin.

We have discovered that when a starch hydrolysate having a DE value not more than about 20 is subjected to the action of cyclodextrin transglycosylase, excellent yields of cyclodextrin are obtained, conversion to cyclodextrin can be readily carried out at high starch concentrations, difficulties with starch retrogradation and starch contamination of the product are avoided, and isolation and purification of the cyclodextrin is simplified. To illustrate the deficiencies of the prior art, previously recommended processes for preparation of cyclodextrin from 5% starch suspension would require processing of 590 gallons of water per 100 pounds of cyclodextrin produced. In the present invention procedure, where a 34% by weight solids content partially hydrolyzed starch solution can be converted with a 50% yield of cyclodextrin, only 58 gallons of water need be processed per 100 pounds of cyclodextrin produced. Although the present process may be used at lower solids content, one of the important practical advantages of the process is that it is possible to produce cyclodextrin in a medium containing a minimal amount of water. The solids content of the starting reaction mixture will usually exceed 10% by weight and preferably, may be between about 20% and about 50% by weight.

The cyclodextrins produced in accordance with this invention are useful for the same purposes as cyclodextrins produced by prior art processes. For example, the products produced in accordance with this invention are useful as flavor releasing agents for tobacco smoke and may be disposed on a supporting filter base for the manufacture of tobacco filters. They are also useful, as is well known, as inclusion agents and for this reason find application in chromatography.

PREPARATION OF STARCH HYDROLYSATE

Any type of starch or starch fraction can be used to produce a starch hydrolysate including cereal and tuber starches, waxy, or high amylose starches, and the amylose or amylopectin fractions therefrom. Crude starch sources may also be used, such as ground cereals, macerated tubers or partially purified starches therefrom. Where crude starch sources are used, the cyclodextrin may be recovered by heating the conversion product to solubilize the cyclodextrin, filtering to remove insolubles and recovering cyclodextrin from the filtrate by crystallization or by precipitation.

Partial hydrolysis of the starch may be accomplished by conventional means. Suitable catalysts for the partial hydrolysis include acids, acid salts, acidic ion exchange resins, and appropriate enzymes. The starch hydrolysate is produced by subjecting gelatinized starch to treatment with acid, or enzyme, or both.

The term "starch hydrolysate" is defined as the product derived from the enzymatic or acidic hydrolysis of starch, said hydrolysis being effected on gelatinized starch.

Where acidic hydrolysis is employed, the acidity during hydrolytic action may be decreased as the temperature and time of hydrolysis are increased to a point where sufficient hydrolytic action may be obtained in neutral solution where the temperature is as high as 400° F.

A particularly suitable method of partially hydrolyzing the starch is by the use of bacterial alpha amylase. The enzyme may be obtained in the form of commercially available heat resistant alpha amylases produced by certain strains of *Bacillus subtilus* or *Bacillus mesentericus*.

While heat stable bacterial alpha amylase preparations are particularly suitable for producing the starch hydrolysate, other alpha amylase preparations may also be used. For example, those derived from bacteria, fungi, cereals, or animals. Where the preparations have a high content of saccharogenic enzyme activity, they should be used under conditions of pH, temperature, and time of conversion so as to emphasize the liquefying enzyme activity, and to minimize the saccharogenic enzyme activity.

When an enzyme is used to effect the partial hydrolysis, the temperature during hydrolysis should be below the inactivation temperature of the enzyme. The hydrolysis catalyst may be added to the starch before, during, or after gelatinization of the starch. Partial hydrolysis is effected in order to reduce the starch paste viscosity to such an extent that the starch may be easily handled at high solids concentration. It also solubilizes the starch so that it is readily available for enzymolysis by the enzyme used to produce the cyclodextrin. In addition, partial hydrolysis minimizes retrogradation of the starch and permits enzymolysis to be carried out efficiently. Furthermore, the cyclodextrin is more easily recovered. It is preferred that the partial hydrolysis be carried out to a DE in the range between about 0.5 and about 6. DE is the abbreviation for dextrose equivalent, which is the total amount of reducing sugars present calculated as dextrose and expressed as percent dry basis.

Although the preferred procedure for the practice of the present invention is that the starch be hydrolyzed to about 0.5 to about 6 DE prior to the enzymolysis to obtain the cyclodextrin, the starch may be hydrolyzed to a greater or lesser degree. If the starch hydrolysate has a DE substantially less than 0.5, the previous problems inherent in the use of unhydrolyzed starches gradually appear at decreasing DE values. These problems include an unmanageable viscosity and retrogradation of the starch. If the partial hydrolysis is carried substantially beyond 6 DE, the yield of cyclodextrins is reduced.

CONVERSION STEP—PRODUCTION OF CYCLODEXTRIN

After the partial hydrolysis, the starch hydrolysate is ready to be converted to cyclodextrin by the action of cyclodextrin transglycosylase. This enzyme is optimally active at temperatures within the range of about 40° C. to about 60° C. and at pH values preferably within the range of about 5.5 to about 7.5. In order to obtain maximum yield of cyclodextrin, it is desirable to maintain the starch substrate within these limits, although somewhat higher or lower pH and temperature values may be used.

The amount of cyclodextrin transglycosylase employed is dependent upon the desired rapidity with which the enzymolysis should be carried out, as well as on the other conversion conditions employed. For instance, if the temperature and pH conditions are maintained constant, the amount of enzyme employed is inversely proportional to the amount of time required to obtain the desired quantity of cyclodextrin. Time, temperature, enzyme quantity and pH may be adjusted to obtain the maximum quantities of conversion product in the minimum amount of time.

Generally, maximum yields of cyclodextrin may be obtained within about 2 to 7 days at 50° C. at a pH of about 7, when the enzyme dosage ranges between about 100 and about 1,000 Tilden-Hudson units per 100 grams of starch.

RECOVERY OF CYCLODEXTRIN

The cyclodextrin present in the conversion liquor may be readily recovered and purified by the precipitation and crystallization techniques of the prior art.

The unique capacity of cyclodextrins to form inclusion compounds with many organic compounds may be utilized to recover the cyclodextrins present in the conversion liquor following enzymolysis. Thus, the addition of an appropriate precipitant such as trichloroethylene, tetrachloroethane, bromobenzene, and the like, results in the precipitation of the cyclodextrin due to the decreased solubility of the complexed cyclodextrin. By taking advantage of the differential solubilities of the different cyclodextrins in the presence of the various precipitants, it is possible to obtain one or another of the cyclodextrins such as alpha or beta cyclodextrin in purified form. It is also possible to control the accumulation of the respective cyclodextrins during the conversion to some extent. The insoluble cyclodextrin complexes may also be purified by recrystallization techniques, and the like, if desired.

Alternatively, solid cyclodextrin may easily be obtained, by direct crystallization from the conversion liquors by known crystallization means. The conversion liquor with the formed cyclodextrin contained therein, after suitable refining, may be evaporated or dried to yield a syrup or a solid containing cyclodextrin.

The invention will now be further described in detail by means of several exemplary demonstrations thereof.

Example I

To a 30% by weight suspension of potato starch at pH 7.2, was added the bacterial alpha amylase preparation HT–1,000 (the proprietary name of a bacterial alpha amylase preparation produced and marketed by Miles Chemical Laboratories) at a concentration of 0.025% of the enzyme preparation by weight, on a starch solids basis. The suspension was gradually added, during a 30 minute period, to a vessel maintained at a temperature of 90–92° C. Agitation was continuous and the temperature maintained for an additional 25 minutes until the starch was partially hydrolyzed to 2.6 DE. The hydrolyzed starch was then immediately adjusted to pH 5.8 heated to 121° C. and held 15 minutes to destroy the residual alpha-amylase activity.

The starch hydrolysate thus obtained was then cooled to 45° C., and the pH was adjusted to 6.0. The hydrolysate was then converted in the presence of 5 milliliters of toluene per 100 milliliters of conversion liquor with an amount of cyclodextrin transglycosylase equivalent to 200 Tilden-Hudson units per 100 grams of starch hydrolysate solids. After 5 days of enzymolysis at 45° C., the conversion liquor was heated to boiling for 15 minutes to inactivate the enzyme and to drive off the toluene and solubilize the cyclodextrin. The conversion product was then filtered while hot.

The filtered conversion liquor was divided into three portions, A, B, and C, and treated as follows.

Portion A was analyzed by direct trichloroethylene precipitation to determine the quantity of cyclodextrins present. The following analytical method was used for each cyclodextrin analysis in all of the examples:

The cyclodextrin content was assayed by adding an excess of trichloroethylene to the conversion liquor (25 ml. per 100 ml. conversion liquor), shaking the mixture 3–7 days at 25°–30° C. vacuum filtering through Whatman No. 1 filter paper, washing the filter cake with a quantity of 5° C. water equivalent to 10% of the volume of the conversion liquor, quantitatively recovering the filter cake, and drying it at 80° C. under a vacuum of about 28 inches of mercury for about 24 hours.

The yield of crude cyclodextrins was calculated from the weight of the cyclodextrin filter cake by the following formula:

Percent cyclodextrin yield = 100

$$\times \frac{\text{dried weight of filter cake per volume of liquor}}{\text{weight of starch solids per volume of liquor}}$$

Portion B was held at 80° C. at a pH of 6 for 24 hours in the presence of 0.02% of a bacterial alpha-amylase preparation (HT–1000) and thereafter heated at 121° C. for 15 minutes to inactivate the enzyme. The amount of cyclodextrin present was then determined as before.

Portion C was treated with bacterial alpha-amylase as described above, heated to a temperature of 121° C. and then cooled to 75° C. Thereafter, the liquor temperature was gradually decreased to about 30° C. over the next 51 hours, while the liquor was stirred to promote crystallization of the cyclodextrin present. The crystals which accumulated were harvested by vacuum filtration, washed, dried, and weighed. These crystals are designated at portion C–1. The combined mother liquor and wash water were refined by treatment with activated charcoal and filtered to remove the carbon. The refined mother liquor was then evaporated to yield a syrup composition designated as portion C–2.

The results of these operations are tabulated below.

TABLE I

| Portion | Description | D.E. | Total dry substance (g./100 ml.) | Cyclodextrin yield, percent |
|---|---|---|---|---|
| A | Original conversion liquor | 4.3 | 41.1 | 39 |
| B | Alpha-amylase treated liquor | 13.1 | 39.2 | 37 |
| C–1 | Crystalline cyclodextrin | | | 27 |
| C–2 | Concentrated mother liquor | 16.8 | 58.0 | 10 |

This example demonstrates the production of cyclodextrin in substantial yields by the process of the present invention. Since the cyclodextrin yield from portions A and B are essentially identical the results show that the cyclodextrin precipitant complex obtained by this process is substantially free of unreacted starch. Moreover, it is demonstrated that suitable enzymes such as bacterial alpha amylase may be employed to hydrolyze non-cyclic glucans remaining in the conversion liquor without an appreciable simultaneous hydrolysis of the cyclodextrin present and without a corresponding decrease in yield. The results also illustrate the capability of recovering cyclodextrin in appreciable quantities by direct crystallization techniques, and demonstrates the preparation of a syrup product containing cyclodextrin.

Example II

This example compares the treatment of a starch hydrolysate with an enzyme to produce cyclodextrin with the treatment of unhydrolyzed starch to produce cyclodextrin.

A 30% by weight suspension of potato starch was treated with bacterial alpha amylase as in Example I, to yield a starch hydrolysate having a D.E. of 2.0 and containing 34 grams of solids per 100 milliliters. This starch hydrolysate was diluted with water to the dry substance levels specified below in Table II. The hydrolysates were then converted at 50° C. and at a pH of 7.2 in the presence of toluene at a cyclodextrin transglycosylase dosage of 200 Tilden-Hudson units per 100 grams of starch dry substance. After 7 days of conversion, the residual enzyme was inactivated by heating at 100° C. for 10 minutes and the cyclodextrin present was assayed by the trichloroethylene precipitation procedure.

The unhydrolyzed starch slurries were prepared at different dry substance levels, gelatinized in the same manner, and treated directly with cyclodextrin transglycosylase. The results obtained are shown in Table II.

TABLE II

| Substrate | Substrate concentration, g./100 ml. | Cyclodextrin produced G./100 ml. | Cyclodextrin produced Percent by wt. of starch | Characteristics of conversion liquor Fluidity | Characteristics of conversion liquor Filtration |
|---|---|---|---|---|---|
| Gelatinized starch | 3.2 | 0.4 | 13 | Fluid | Poor. |
| | 5.4 | 1.5 | 28 | do | Do. |
| | 8.1 | 2.5 | 31 | do | Do. |
| | 10.8 | 4.3 | 40 | do | Do. |
| | 16.1 | | | Not fluid | Not filterable. |
| | 21.5 | | | do | Do. |
| Partially hydrolyzed Starch (2.0 D.E.). | 3.4 | 0.9 | 26 | Fluid | Good. |
| | 5.7 | 2.1 | 37 | do | Do. |
| | 8.5 | 3.4 | 40 | do | Do. |
| | 11.3 | 4.7 | 42 | do | Do. |
| | 17.0 | 7.9 | 46 | do | Do. |
| | 22.7 | 11.0 | 48 | do | Do. |
| | 28.3 | 13.2 | 47 | do | Do. |
| | 34.0 | 17.6 | 52 | do | Do. |

This example demonstrates the capability of the present process to produce cyclodextrin in high yields at high dry substance levels. Prior art processes are devoid of this capability.

The results further demonstrate that what has previously been believed is still applicable, namely, that high solids conversions are not practical when the substrate consists of gelatinized, unhydrolyzed starch.

Example III

The effect that the extent of hydrolysis exerts on the yield of cyclodextrin obtainable from starch hydrolysates is demonstrated by the use of 30% by weight dispersions of enzyme thinned waxy milo starch.

The thinning procedure in this example was similar to that described in Example I, except that an appropriate amount of bacterial alpha-amylase was used so that varying D.E. values could be obtained. 30% by weight dispersions of waxy milo starch were hydrolyzed at a temperature of 90° C. to 92° C. for a period of time that was required to obtain the different D.E. values.

Separate samples of the partially hydrolyzed starch at 34 grams dry substance per 100 ml. were heated to 121° C. to destroy residual alpha-amylase activity. The samples were thereafter converted at 50° C. and a pH of 7.2 in the presence of toluene at a cyclodextrin transglycosylase dosage of 400 Tilden-Hudson units per 100 grams starch solids. The cyclodextrin present was determined after 4 and 7 days of conversion by the trichloroethylene precipitation procedure previously described. Table III below shows that yields exceeding 40% cyclodextrin are obtained when the starch is hydrolyzed prior to conversion to a D.E. in the range of 0.4–6, and that cyclodextrin yields exceeding 3 grams per 100 ml. are obtained at a D.E. as high as 20.

TABLE III

| D.E. of partial hydrolysate | Cyclodextrin yield, g./100 ml. | | Cyclodextrin yield, percent | |
|---|---|---|---|---|
| | 4 days | 7 days | 4 days | 7 days |
| 0.4 | 16.5 | 18.4 | 49 | 54 |
| 1.0 | 15.3 | 17.4 | 45 | 51 |
| 1.9 | 14.3 | 18.0 | 42 | 53 |
| 3.5 | 12.2 | 15.3 | 36 | 45 |
| 6.0 | 10.5 | 14.0 | 31 | 41 |
| 8.8 | 8.2 | 10.9 | 24 | 32 |
| 12.0 | 5.8 | 7.5 | 17 | 22 |
| 15.1 | 4.4 | 6.1 | 13 | 18 |
| 17.1 | 3.1 | 5.1 | 9 | 15 |
| 19.6 | 2.7 | 3.7 | 8 | 11 |
| 22.9 | 1.7 | 2.4 | 5 | 7 |
| 25.5 | 0.7 | 0.7 | 2 | 2 |

Example IV

This example illustrates that, for maximum efficiency, it is desirable to carry out cyclodextrin conversions in the presence of an adequate amount of a suitable precipitant. Presumably, the precipitant's function is to form insoluble complexes with the cyclodextrins as they are produced, which in effect removes the cyclodextrins from the reaction mixture, thereby shifting the equilibrium of the reaction in favor of more extensive cyclodextrin production. Examples of suitable precipitants are shown in Table IV, below.

In this example a 30% by weight suspension of potato starch was thinned to 1.9 D.E. and heated following the procedure described in Example I. The thinned starch was divided into several portions and converted at 50° C., at a pH of 7.0 and at a cyclodextrin transglycosylase dosage of 500 Tilden-Hudson units per 100 grams of substrate, dry substance. Five hours after the conversion was initiated, the cyclodextrin precipitating agent was dispersed in the conversion liquor in an amount equivalent to about 20 grams per 100 grams of substrate solids.

After 3 days conversion for one set of portions, and after 4 days conversion for a second set of portions, the enzyme was inactivated by boiling. To avoid the possibility of unreacted starch interfering with the cyclodextrin determination, each liquor was then reacted with 0.01% of the bacterial alpha-amylase (HT-1000) for 24 hours at 60° C., and at a pH of 7.0. After the bacterial alpha-amylase was inactivated by boiling, the quantity of cyclodextrin formed was determined by trichloroethylene precipitation. The yield enhancement exerted by the precipitants is also shown in Table IV.

TABLE IV

| Precipitant | Starch concentration (g./100 ml.) | Cyclodextrin produced (g./100 ml.) | | Cyclodextrin yield (percent) | |
|---|---|---|---|---|---|
| | | 3 days | 4 days | 3 days | 4 days |
| p-Cymene | 33.3 | 14.8 | 16.8 | 44 | 50 |
| Tetrachloroethane | 33.3 | 14.9 | 15.7 | 45 | 47 |
| Benzene | 33.3 | 13.2 | 15.7 | 40 | 47 |
| Carbon disulfide | 33.3 | 13.1 | 15.4 | 39 | 46 |
| Toluene | 33.3 | 13.0 | 15.1 | 39 | 45 |
| Naphthalene (in ether) | 33.9 | 13.3 | 15.3 | 39 | 45 |
| Trichloroethylene | 33.3 | 12.6 | 14.4 | 38 | 43 |
| Cyclohexane | 33.3 | 15.5 | 13.8 | 47 | 41 |
| Hexane | 33.3 | 10.2 | 11.7 | 31 | 35 |
| Chloroform | 33.5 | 10.4 | 11.6 | 31 | 35 |
| Bromobenzene | 33.5 | 9.3 | 11.5 | 28 | 34 |
| Carbon tetrachloride | 33.5 | 10.4 | 10.8 | 31 | 32 |
| Anthracene (in ether) | 33.9 | 10.9 | 10.3 | 32 | 30 |
| Thymol | 33.3 | 6.3 | 7.6 | 19 | 23 |
| None (control) | 33.3 | 3.7 | 3.2 | 11 | 10 |

Example V

This example illustrates the production of cyclodextrin in substantial yields from high dry substance concentrations of corn starch by the process of the present invention.

Corn starch is representative of those starches which upon gelatinization possess high paste viscosities and exhibit a pronounced tendency to retrograde. These paste properties have precluded the use of corn and similar starches in the efficient production of cyclodextrin by previous processes.

A 30% by weight suspension of corn starch was partially hydrolyzed to 2.1 D.E. and heated following the procedure described in Example I. This starch hydrolysate was divided into several portions which were then converted at pH 7.2 and 50° C. in the presence of toluene with cyclodextrin transglycosylase for the times and under the conditions indicated in Table V. The cyclodextrin transglycosylase activity was destroyed after conversion by heating to 100° C. for 10 minutes. To avoid the possibility of unreacted starch interfering with the cyclodextrin determination, the conversion liquors were exposed to the action of the bacterial alpha-amylase as described previously. After boiling to inactivate bacterial alpha-amylase, the cyclodextrin present was determined by trichloroethylene precipitation. The results obtained are shown in Table V.

TABLE V

| Conversion temperature (°C.) | Enzyme dosage (units/100 g.d.s.) | Total dry substance (g./100 ml.) | Cyclodextrin (g./100 ml.) | | Cyclodextrin yield (percent) | |
|---|---|---|---|---|---|---|
| | | | 4 days | 7 days | 4 days | 7 days |
| 55 | 200 | 38.1 | 15.3 | 20.3 | 40 | 53 |
| | 400 | 38.1 | 20.8 | 22.0 | 55 | 58 |
| 60 | 200 | 38.1 | 15.8 | 17.7 | 42 | 47 |
| | 400 | 38.1 | 18.9 | 21.3 | 50 | 56 |

Example VI

This example illustrates the efficient production of cyclodextrin at high solids concentrations from starch which has been partially hydrolyzed by conventional acid hydrolysis.

Hydrochloric acid was added to an 18% by weight suspension of waxy milo starch to obtain a normality of 0.032. The temperature of this mixture was increased to 97°–99° C. to effect gelatinization and partial hydrolysis. After the starch was hydrolyzed to 3.4 D.E., sodium hydroxide was added to attain a pH of 5.6, thus terminating the acid hydrolysis. The resulting starch hydrolysate was subsequently filtered, concentrated to 30% dry substance by evaporation, and converted with cyclodextrin transglycosylase at 55° C. and a pH of 7.0 in the presence of toluene.

Following four and seven days conversion of separate portions of the hydrolysate, the cyclodextrin formed was determined by trichloroethylene precipitation. The results appear below in Table VI. Table VI also includes two tests wherein the starch was hydrolyzed by acid hydrolysis to a D.E. of 8.1, prior to being used as a substrate for cyclodextrin conversions. These conversions are also shown.

TABLE VI

| D.E. of partial hydrolysate | Dry substance concentration (g./100 ml.) | Enzyme dosage | Cyclodextrin yield, percent | |
|---|---|---|---|---|
| | | | 4 days | 7 days |
| 3.4 | 18.5 | 200 | 29 | 38 |
| 3.4 | 18.5 | 400 | 39 | 48 |
| 3.4 | 32.5 | 200 | 28 | 35 |
| 3.4 | 32.5 | 400 | 37 | 47 |
| 8.1 | 34.5 | 200 | 15 | 19 |
| 8.1 | 34.5 | 400 | 19 | 23 |

The advantages of the present invention are many. One important advantage is that the process permits cyclodextrin conversion to be efficiently performed at high solids concentration. Another advantage is that cyclodextrin conversions can be carried out with a wider selection of substrate starches, such as corn starch, which was essentially unsuitable heretofore. Another important feature of the invention is that it leads to improved process economics, particularly because lower capital expenditures are required to produce a given quantity of cyclodextrin, because the invention leads to improved product recovery, and because substrate levels higher than 3% to 5% solids concentration may be used. As a result of this invention it is not only possible to conduct the conversions at substrate levels of 20% to 30%, but it is desirable to do so because the advantages listed above are realized with essentially no decrease in conversion efficiency.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:

1. A process for preparing cyclodextrin from a starch hydrolysate having a D.E. not substantially less than about 0.5 to a D.E. not exceeding about 20, which comprises subjecting said starch hydrolysate to conversion with cyclodextrin transglycosylase in an aqueous medium, to obtain a conversion product containing cyclodextrin.

2. A process as in claim 1 wherein the starch hydrolysate has a D.E. not exceeding about 6.

3. A process as in claim 1 wherein the starch hydrolysate has a solids content of at least about 10% by weight.

4. A process as in claim 1 wherein the starch hydrolysate has a solids content between about 10% and about 40% by weight.

5. A process in accordance with claim 1 wherein the conversion temperature is from about 40° C., to about 60° C.

6. A process in accordance with claim 5 wherein the conversion temperature is from about 45° C. to about 55° C.

7. A process in accordance with claim 1 wherein the conversion pH is from about 5.5 to about 7.5.

8. A process in accordance with claim 7 wherein the conversion pH is from about 6.0 to about 7.5.

9. The process of claim 1 wherein the starch hydrolysate is acid hydrolysate.

10. The process of claim 1 wherein the starch hydrolysate is an enzyme hydrolysate.

11. A process for the preparation of cyclodextrin from starch which comprises partially hydrolyzing starch to a D.E. not substantially less than about 0.5 to a D.E. not exceeding about 20, and subsequently subjecting the partially hydrolyzed starch to conversion with cyclodextrin transglycosylase in an aqueous medium, to obtain an aqueous conversion product containing cyclodextrin.

12. A process as in claim 11 wherein the starch is partially hydrolyzed to a D.E. not exceeding about 6.

13. A process as in claim 11 wherein the starch hydrolysate has a solids content of at least about 10% by weight.

14. A process as in claim 11 wherein the starch hydrolysate has a solids content of between about 10% and about 40% by weight.

15. A process for the preparation of cyclodextrin from a starch hydrolysate which comprises subjecting a starch hydrolysate having a D.E. not substantially less than about 0.5 to a D.E. not exceeding about 20 to conversion with cyclodextrin transglycosylase in an aqueous medium and in the presence of a cyclodextrin precipitant to obtain a conversion product containing cyclodextrin.

16. A process as in claim 15 wherein the starch hydrolysate has a D.E. not exceeding about 6.

17. A process as in claim 15 wherein the starch hydrolysate has a solids content of at least about 10%.

18. A process as in claim 15 wherein the starch hydrolysate has a solids content of between about 10% and about 40% by weight.

19. A process for preparing cyclodextrin from a starch hydrolysate having a D.E. not substantially less than about 0.5 to a D.E. not in excess of 20, comprising subjecting said hydrolysate to conversion with cyclodextrin transglycosylase in an aqueous medium at a temperature in the range from about 40° C. to about 60° C., and at a pH in the range from about 5.5 to about 7.5, to obtain an aqueous conversion product containing at least about 3 grams of cyclodextrin per 100 milliliters of conversion product.

20. A process in accordance with claim 19 wherein the conversion period is from about 2 days to about 7 days.

21. A process in accordance with claim 19 wherein the starch hydrolysate has a solids content in the range of from about 10% to about 40% by weight.

22. A process in accordance with claim 19 wherein the conversion is conducted in the presence of a cyclodextrin precipitant.

23. A process in accordance with claim 19 wherein the starch hydrolysate is produced by treating gelatinized starch with a hydrolyzing agent selected from the group consisting of acid, enzyme, and a combination thereof.

24. A process in accordance with claim 19 wherein the cyclodextrin-containing conversion product is concentrated to yield a syrup having a solids content greater than 50%.

25. A process in accordance with claim 19 wherein the cyclodextrin-containing conversion product is concentrated sufficiently to obtain a substantially solid cyclodextrin-containing product.

References Cited

J. Am. Chem. Soc., vol. 71, pp. 353–356, 1949.

ALVIN E. TANENHOLTZ, *Primary Examiner.*

U.S. Cl. X.R.

195—103.5, 66